July 5, 1955

E. SCHROTER 2,712,369

MAGNETIC RECORDER

Filed Sept. 8, 1948

3 Sheets-Sheet 1

Inventor
Edward Schroter
By Fetherstonhaugh & Co.
Attorneys

July 5, 1955 E. SCHROTER 2,712,369

MAGNETIC RECORDER

Filed Sept. 8, 1948 3 Sheets-Sheet 2

Inventor
Edward Schroter
By Fetherstonhaugh & Co.
Attorneys

July 5, 1955

E. SCHROTER 2,712,369

MAGNETIC RECORDER

Filed Sept. 8, 1948

3 Sheets-Sheet 3

Inventor
Edward Schroter

By Fetherstonhaugh & Co.
Attorneys

United States Patent Office 2,712,369

Patented July 5, 1955

2,712,369

MAGNETIC RECORDER

Edward Schroter, Montreal, Quebec, Canada, assignor, by mesne assignments, to Ralph J. Samuels, Los Angeles, Calif.

Application September 8, 1948, Serial No. 48,291

16 Claims. (Cl. 192—4)

This invention relates to improvements in the control of magnetic recorders.

A magnetic recorder is a device by means of which sounds, usually in the form of voice or music, may be magnetically recorded on a special magnetic tape. The device also plays back or reproduces the recorded sounds. The tape may be stopped at any time and its movement may be reversed so that any portion of it may be repeated.

An object of the present invention is the provision of a magnetic recorder in which the magnetic tape may be instantly stopped regardless of the direction in which it is moving.

Another object is the provision of a magnetic recorder in which the tape is maintained at a constant speed during both the recording and the playing back phases.

A further object is the provision of a magnetic recorder in which the tape may be very quickly rewound for playback purposes.

Yet another object is the provision of a device of the nature described in which tension is maintained on the tape in order to keep it in its proper course at all times.

Figure 1:
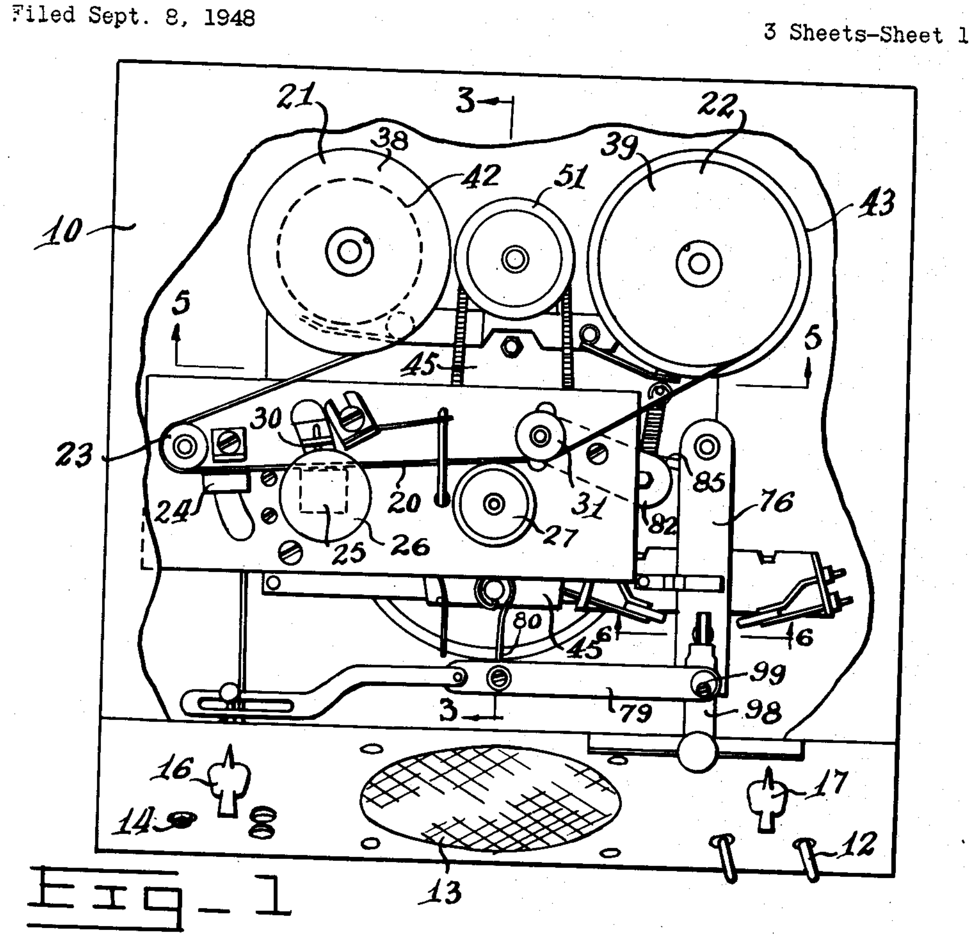
Figure 2:
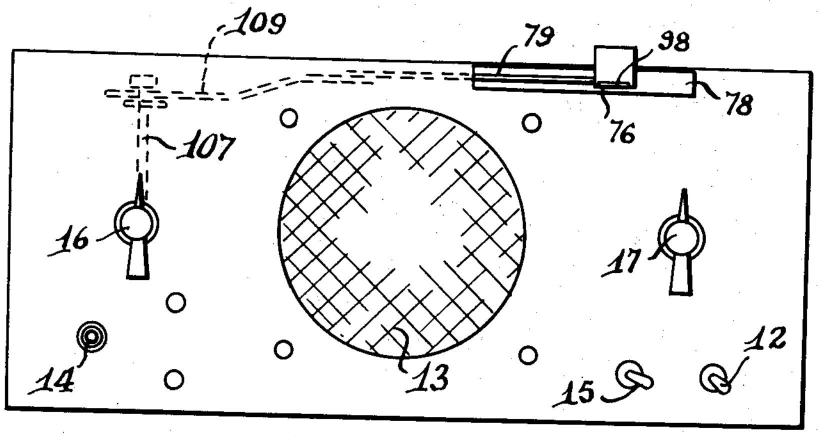
Figure 3:
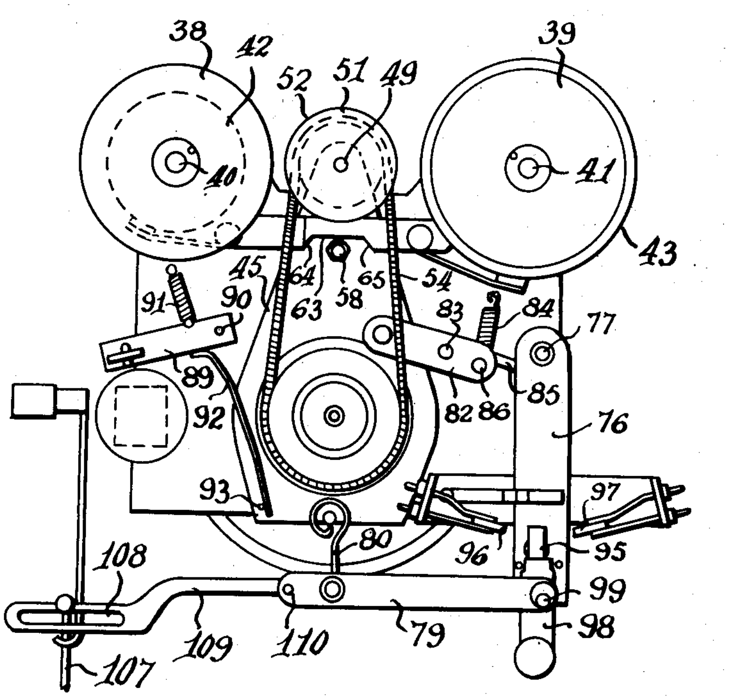
Figure 4:
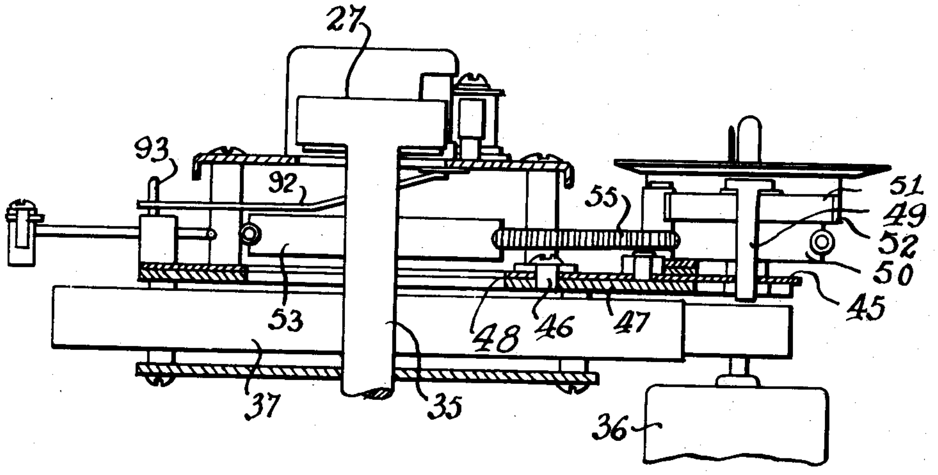
Figure 7:
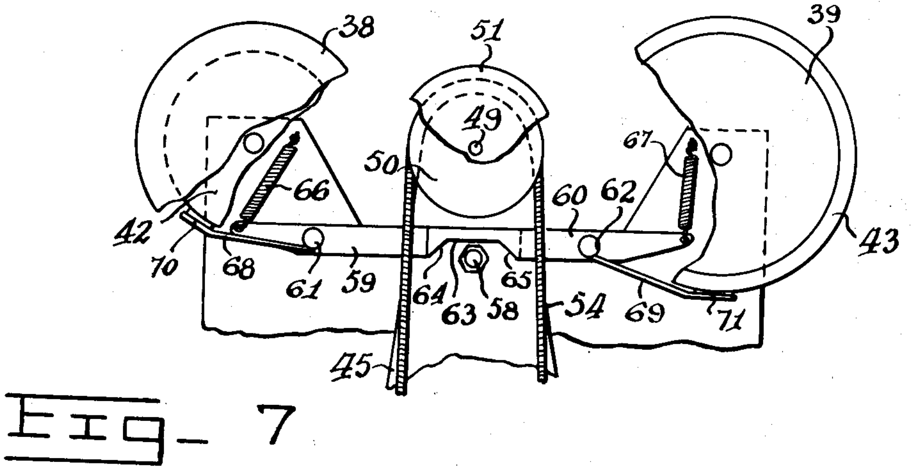
Figure 5:
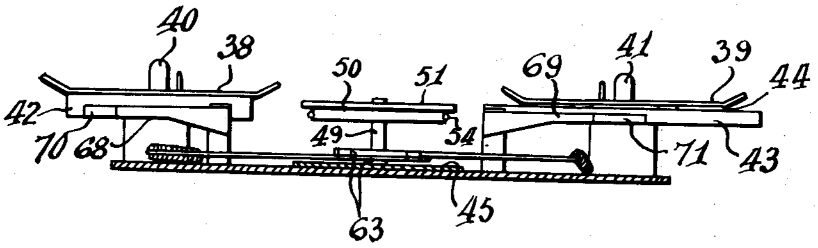
Figure 6:
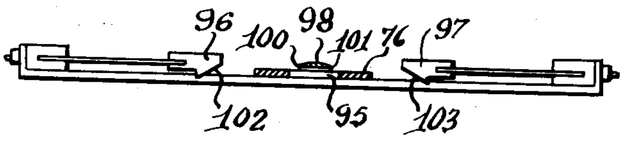

With the above and other objects in view, the present invention consists essentially in a magnetic recorder having feeder and receiver turntables adapted to hold reels containing recording tape which moves from one to the other past an erasing magnet, a magnetic head, and a driving capstan; means normally braking the turntables, means for selectively rotating the turntables, and a control lever connected to the braking means and the rotating means, said lever being operable to release the braking means and drive either turntable, as more fully described in the following specification and illustrated in the accompanying drawings, in which, Figure 1 is a plan view of a magnetic recorder according to the present invention, with part of the top broken away, Figure 2 is a front elevation of the recorder, Figure 3 is a plan view of a recorder with a supporting plate and the tape with some of its associated elements removed, Figure 4 is a vertical cross section taken on the line 3—3 of Figure 1, Figure 5 is a transverse section taken substantially on the line 5—5 of Figure 1, Figure 6 is an enlarged section taken substantially on the line 6—6 of Figure 1, and Figure 7 is a fragmentary plan view of the brake mechanism.

Referring more particularly to the drawings, 10 is a casing containing the electrical equipment for a magnetic recorder. As the electrical details of this device do not form any part of this invention, they have been omitted for the sake of clarity. This device includes a switch 12 for turning the recorder on or off, an opening 13 for a loud speaker, a jack 14 for plugging in a microphone, a switch 15 for turning the recorder to the loud speaker or to the earphones, if the latter are used, a switch 16 which may be turned to one position for "recording" and to another position for "listening," and a volume control 17.

A special magnetic tape 20 extends from reel 21 to reel 22, and when in place on the recorder, said tape extends around a guide pulley 23 past suitable erasing means, such as an erasing magnet 24, a magnetic head 25 in a shield 26, and a capstan 27. When the switch 16 is turned to the recording position, the erasing means is brought into operation. In the case of an erasing magnet, it is pressed against the tape, and when said switch is turned to the listening position, the erasing means becomes inoperative, or the magnet is moved away from the tape. The connection between the switch and the erasing means or magnet may be any suitable type. An operating pad 30 is adapted removably to press the tape against the magnetic head 25, while a rotatable drive pulley 31 is adapted removably to press the tape against the capstan 27.

The capstan is mounted on the upper end of a shaft 35 which is rotated by a motor 36 in the casing 10 through a fly-wheel 37 mounted on said shaft. This motor is energized when the switch 12 is turned on. Reel carrying members 38 and 39, having centering pins 40 and 41, are mounted on turntables 42 and 43, respectively. The member 38 is fixed to the turntable 42, while the upper surface of the turntable 43 is formed with a friction surface 44 upon which the member 39 rests. It will be noted that the turntable 43 is considerably larger in diameter than the turntable 42.

The reels 21 and 22 are adapted to be positioned on the reel carrying members 38 and 39 by the centering pins thereof.

A lever plate 45 is rotatably mounted on a pivot 46 carried by a supporting plate 47 and extends outwardly from each side thereof, one end of said plate extending between the turntables. This plate has a hole 48 therein through which the shaft 35 projects. A vertical pin 49 is carried by the plate 45 at a point between the turntables and has a rotatable pulley 50 and a driving disc 51 mounted thereon, said disc being fixed to rotate with the pulley and having a friction surface 52 at its periphery. Another pulley 53 is fixedly mounted on the shaft 35 above the lever plate and is connected to the pulley 50 by a suitable belt 54. Thus, when the capstan is rotated, the driving disc also is rotated through the pulleys 50 and 53 and the belt 54.

The driving disc 51 is so located on the lever plate, that when the latter is pivoted laterally, said disc moves into engagement with either of the turntables 42 or 43. The driving disc frictionally engages the turntables to turn them and their respective reel carrying members. The member 38 is positively driven in this manner, while the member 39 is driven by the friction surface 44 of its turntable. The member 38 is driven considerably faster than the member 39 owing to the difference in the diameters of the turnables 42 and 43.

Figure 7 clearly illustrates the braking system for the turntables 42 and 43 and their reel carrying members. A pin 58 projects upwardly from the lever plate 45 near the driving disc 51. Bars 59 and 60 pivotally mounted at 61 and 62 near the turntables 42 and 43, overlap at their inner ends, and each of these bars is formed with a notch 63 having bevelled surfaces 64 and 65 at its opposite ends. One notch is directly above the other and the pin 58 lies in said notches and is normally positioned substantially midway between the bevelled surfaces. Springs 66 and 67, connected to the outer ends of the bars, keep the latter pressing against the pin 58.

Arms 68 and 69 are connected to the bars 59 and 60 at their pivot points, said arms having brake shoes 70 and 71 on their outer ends normally pressing against the turntables 42 and 43. The springs 66 and 67 keep the shoes in their normal braking positions.

When the lever plate 45 and its pin 58 are in their normal positions, the brakes 70 and 71 are pressing against the turntables 42 and 43 firmly to hold the latter stationary. When the lever plate is pivoted laterally in either direction, its pin engages one of the bevelled surfaces 64 or 65 to pivot the bars 59 and 60 against the tension of the springs 66 and 67. This causes the arms 68 and 69 to pivot and move the brakes 70 and 71 away from the adjacent turntables.

A control lever 76 is pivotally mounted at its inner end, as at 77, at one side of the lever plate substantially parallel therewith. This control lever extends towards an opening 78 formed in the front wall of the casing 10. A link 79 extends from the control lever from a point spaced inwardly from its outer end to a point in front of the outer end of the lever plate, to which it is connected by means of a spring 80. Lateral movement of the control lever causes the lever plate to pivot laterally.

The drive pulley 31 is rotatably mounted at one end of an arm 82 which is pivotally mounted at 83, see Figure 3, said pulley normally being urged towards the capstan by a spring 84 connected to the arm 82 on the end thereof remote from the pulley. A finger 85 projects outwardly from the control lever at its pivot point and engages a pin 86 in the adjacent end of arm 82. When the control lever is moved to the left, in Figure 3, the finger 85 permits the spring 84 to pivot the arm 82 and move the pulley 31 towards the capstan. As the tape 20 is positioned between these, the pulley presses said tape into engagement with the capstan. When the control lever is returned to its normal position or is moved in the opposite direction, the pulley is moved away from the capstan by the finger bearing against the pin 86. The pulley moves away from the capstan sufficiently to permit the tape to clear the magnetic head.

The operating pad 30 is located on the end of an arm 89 pivotally mounted at 90, and said pad is normally urged against the magnetic head 25 by a spring 91. A relatively long spring 92 is connected at one end to the arm 89, while its opposite end extends over the plate 45 and bears against one side of a pin 93. When the control lever and the outer end of the lever plate are moved to the right, in Figure 3, the pin 93 presses against the spring 92 to cause the arm 89 to move the operating pad away from the magnetic head. When the lever and lever plate are moved to their normal positions, the operating pad is returned to its normal position bearing against the magnetic head or pressing a tape therebetween against said head. When the control lever is moved to the left, the operating pad is not disturbed.

Suitable means is provided for locking the control lever in either its left or right positions. The control lever is provided with a catch spaced inwardly from its outer end. For simplicity, this catch may be in the form of an opening 95 formed in the lever. Dogs 96 and 97 are resiliently mounted on opposite sides of the lever substantially in line with the catch 95. When the lever is moved towards a dog, the latter removably engages its catch. A latch 98 is mounted on the outer end of the control lever by a pivot 99, said latch extending beyond the lever end and out through the opening 78. The inner end of the latch terminates above the catch 95 and is formed on its opposite sides with bevels 100 and 101 adapted to co-operate with bevels 102 and 103 formed on the dogs 96 and 97, respectively.

Assuming that the control lever is locked in one position by the dog 96, when it is desired to move the lever to its normal position or to its opposite position, the latch 98 is moved to the right. During the first part of the movement, the latch pivots and its bevel 100 engages the bevel 102 to raise the dog above the catch to release the lever. Further movement forces the lever in the desired direction. Similarly, when the lever is locked in the opposite position by the dog 97, the latch automatically releases the lever as it is moved away from the dog.

When the control lever is moved to the left, it is in the forward position, that is, the tape 20 is moved forwardly from reel 21 to reel 22. During this movement, the sounds may be recorded on the tape or they may be played back from the tape. When the control lever is moved to the right, it is in the rewind position, that is, the tape is moved in the opposite direction.

When the control lever is in its normal or neutral position, the lever plate 45 is in its normal position and the brakes 70 and 71 are applied to the turntables 42 and 43, thus breaking the reels 21 and 22. When the lever is moved to the left into its forward position, the link 79 pivots the lever plate to bring the driving turntable 51 into engagement with the disc 43. The spring 80 firmly urges the disc and turntable together. Just before they come together, the pin 58 of the lever plate moves the bars 59 and 60 to release the brakes. At the same time, the finger 85 releases the arm 82 and permits the spring 84 to urge the drive pulley 31 towards the rotating capstan 27 to press the tape against said capstan. It will be noted that the turntable 43 starts to rotate before the tape is pressed against the capstan. This ensures tension being applied to the tape before it starts to be driven by the capstan. As this capstan is rotating at a constant speed, the tape also is moved at a constant speed. However, as the tape builds up on the reel 22, there is a tendency to increase the speed of the tape, but the reel carrying member 39 slips on the turntable so that the speed of the tape is not increased. As the operating pad 30 is pressing the tape against the magnetic head at this time, the device is recording or playing back, depending upon the setting of the switch 16. The dog 96 locks the control lever in this position.

When the latch 98 is moved to return the control lever to its neutral position, it first disengages the dog 96 to release the lever. This movement returns the lever plate to its normal position and the finger 85 moves the pulley 31 away from the capstan. The spring 80 ensures the pulley being moved away from the capstan before the drive is removed from the turntable 43. The brakes are applied to the turntables under the reel carrying members as soon as the lever plate starts to move.

When it is desired to rewind the tape or any portion of it onto the reel 21, the control lever is moved to the right, in which position it is locked by the dog 97. The pulley 31 is moved further away from the capstan so that the tape clears the magnetic head to prevent reproduction of the sounds in reverse. The switch 16 should be turned to the listen position before the control lever is moved in order to remove the erasing magnet 24 from the tape. The control lever moves the lever plate, and the first part of the movement causes the pin 93 to engage the spring 92 to move the operating pad away from the magnetic head. As the same time, the brakes are released, and further movement brings the driving disc 51 into engagement with the turntable 42. As the latter turntable is relatively smaller, the tape is quickly rewound on to the reel 21.

When the control lever is returned to the neutral position, the latch 98 first disengages the dog 97 from the lever. This movement separates the disc 51 and turntable 42, applies the brakes, and returns the pad 30 to its normal position.

If desired, suitable means may be provided for automatically moving the switch 16 to the listen position when the control lever is moved to rewind the tape. For example, this switch may have a lever 107 inside the casing projecting upwardly therefrom through an elongated slot 108 formed in an arm 109 which is fixedly connected to the link 79 at 110, see Figure 3. The slot 108 is of such length that when the control lever is moved to the right, the lever 107 is moved in the same direction and this turns switch 16 to the listen position. When the control lever is moved to the left, the lever 107 and the switch remain stationary so that the tape moves forwardly and the sounds are reproduced. In order to record, it is only necessary to turn the switch to the record position.

What I claim as my invention is:

1. In a magnetic sound recorder having a casing, a pair of laterally spaced reel carrying turntables mounted on shafts for rotation about separate axes, a motor fixedly secured to said casing, a power actuated driving disc operatively driven by said motor and mounted between said turntables to rotate about an axis parallel to the axes of rotation of said turntables and movable in opposite directions with the axis of said disc maintained in said parallel relation for selective, direct driving engagement with the turntables, said turntables being rotated in the same direction, and means to hold said disc in yielding driving engagement with one of said turntables.

2. In a magnetic sound recorder having a casing, a pair of laterally spaced reel carrying turntables mounted on shafts for rotation about separate axes, a motor fixedly secured to said casing, a power actuated driving disc operatively driven by said motor and rotatable about an axis parallel to the axes of rotation of said turntables, means mounting said disc between said turntables for swinging movement of said disc in opposite directions with its axis parallel to the axes of said turntables to selectively, directly drive the turntables, said turntables being rotated in the same direction, and means to hold said disc in yielding driving engagement with one of said turntables.

3. A magnetic sound recorder as set forth in claim 2, said disc mounting means comprising an arm mounted for rotation about a pivotal axis, said arm extending between said turntables and supporting said disc for rotation about an axis parallel to the axes of said turntables at a point intermediate the turntables, and actuating means for rotating said arm about its pivotal axis.

4. In a magnetic sound recorder, a pair of laterally spaced reel carrying turntables mounted for rotation about separate axes, a power actuated driving disc rotatable about an axis parallel to the axes of rotation of said turntables, means mounting said disc between said turntables for swinging movement of said disc in opposite directions with its axis parallel to the axes of said turntables to selectively engage said turntables to rotate same, said disc mounting means comprising an arm mounted for rotation about a pivotal axis, said arm extending between said turntables and supporting said disc for rotation about an axis parallel to the axes of said turntables at a point intermediate the turntables, actuating means for rotating said arm about its pivotal axis, a brake mechanism normally frictionally engaging said turntables, and means movable with said arm and engageable with said brake mechanism to release the frictional braking engagement with the turntables when said arm is rotated to selectively engage the driving disc with one of the turntables.

5. In a magnetic sound recorder having a casing, a pair of laterally spaced reel carrying turntables mounted on shafts for rotation about separate vertical axes, a disc carrying arm mounted for rotation about a vertical axis and having one free end extending therefrom to a point intermediate said turntables, a motor fixedly secured to said casing, a driving disc mounted for rotation about an axis parallel to the axes of rotation of said turntables on the free end of said arm intermediate said turntables, a pulley mounted on said motor and connected to said driving disc for rotation of same, means connected to said disc carrying arm for rotation of said arm to selectively move said driving disc with its axis in parallel relation into direct driving engagement with one of the turntables, said turntables being rotated in the same direction when driven by said disc, and means to hold said disc in yielding driving engagement with one of said turntables.

6. In a magnetic sound recorder, a pair of laterally spaced reel carrying turntables mounted for rotation about separate vertical axes, a disc carrying arm mounted for rotation about a vertical axis and having one free end extending therefrom to a point intermediate said turntables, a driving disc mounted for rotation about an axis parallel to the axes of rotation of said turntables on the free end of said arm intermediate said turntables, a power driven pulley mounted on a vertical axis and connected to said driving disc for rotation of same, means connected to said disc carrying arm for rotation of said arm to selectively move said driving disc with its axis in said parallel relation into driving engagement with one of said turntables, and a braking mechanism normally frictionally engaging said turntables and means movable with said disc carrying arm during rotation of the latter to engage said braking mechanism for releasing said frictional engagement of the braking mechanism when said disc is moved into driving engagement with one of said turntables.

7. In a magnetic sound recorder, a pair of laterally spaced reel carrying turntables mounted for rotation about separate vertical axes, a disc carrying arm mounted for rotation about a vertical axis and having one free end extending therefrom to a point intermediate said turntables, a driving disc mounted for rotation about an axis parallel to the axes of rotation of said turntables on the free end of said arm intermediate said turntables, a power driven pulley mounted on a vertical axis and connected to said driving disc for rotation of same, means connected to said disc carrying arm for rotation of said arm to selectively move said driving disc with its axis in said parallel relation into driving engagement with one of said turntables, a braking mechanism normally frictionally engaging said turntables and means carried by and operable by said disc carrying arm during rotation of the latter to engage said braking mechanism for releasing said frictional engagement of the braking mechanism when said disc is moved into driving engagement with one of said turntables, said braking mechanism comprising a pair of brake levers mounted to rotate about fixed pivotal axes at opposite sides of said disc carrying arm, said brake levers having their inner ends arranged in overlapping relation, said overlapping ends having vertically aligned cam slots in one side wtih beveled surfaces at opposite ends of the slot, an actuating post carried by said disc carrying arm to ride in said cam slots, a brake shoe arm secured to each brake lever and provided with a brake shoe at its outer free end normally frictionally engaging the adjacent turntable, said brake levers being normally biased for pressure of the cam slot surfaces against said actuating post and for pressure of the brake shoe arms against said turntables, said actuating post being movable along the cam slots in response to rotary movement of the disc carrying arm to selectively engage the beveled surfaces of said cam slots to rotate said brake levers against the biasing of said levers.

8. In a magnetic sound recorder, a pair of laterally spaced reel carrying turntables mounted for rotation about separate vertical axes, a disc carrying arm mounted for rotation about a vertical axis and having one free end extending therefrom to a point intermediate said turntables, a driving disc mounted for rotation about an axis parallel to the axes of rotation of said turntables on the free end of said arm intermediate said turntables, a power driven pulley mounted on a vertical axis and connected to said driving disc for rotation of same, means connected to said disc carrying arm for rotation of said arm to selectively move said driving disc with its axis in said parallel relation into driving engagement with one of said turntables, said means for rotating the disc carrying arm comprising a control lever pivotally mounted at its inner end to swing about a vertical axis, a link connected at one end to the control lever, and a resilient pressure member connected at one end to the other end of said link and at its other end to said disc carrying arm at a point remote from the pivotal axis of the driving disc mounting arm to exert resilient pressure of the driving disc against the turntable when said disc is moved to engagement therewith.

9. In a magnetic sound recorder, a pair of laterally spaced reel carrying turntables mounted for rotation about separate vertical axes, a disc carrying arm mounted for rotation about a vertical axis and having one free end extending therefrom to a point intermediate said turntables, a driving disc mounted for rotation about an axis parallel to the axes of rotation of said turntables on the free end of said arm intermediate said turntables, a power driven pulley mounted on a vertical axis and connected to said driving disc for rotation of same, means connected to said disc carrying arm for rotation of said arm to selectively move said driving disc with its axis in said parallel relation into driving engagement with one of said turntables, said means for rotating the disc carrying arm comprising a control lever pivotally mounted at its inner end to swing about a vertical axis, a link connected at one end to the control lever intermediate its length and a resilient pressure member connected at one end to the other end of said link and at its other end to said disc carrying arm on the side of its pivotal axis remote from the driving disc mounting to exert resilient pressure of the driving disc against the turntable when said disc is moved to engagement therewith, a control lever locking mechanism comprising a dog resiliently mounted on opposite sides of the lever substantially in line with a slot provided in said lever and adapted to engage in said slot when the lever is rotated toward said dog, a latch pivotally mounted on said control lever and having its inner end terminating above the slot in said lever, said latch being movable about its pivotal axis for engaging the dog when the latter is in said slot to release said dog from said slot to permit rotation of said control lever.

10. A magnetic sound recorder as set forth in claim 1 and including, lever means operable for moving said disc into direct driving engagement with the turntables, a brake mechanism normally frictionally engaging said turntables, and means actuated by said lever means and engageable with said brake mechanism to release the frictional engagement with the turntables when said lever means is operated for moving said disc into driving engagement with one of the turntables.

11. A magnetic sound recorder as set forth in claim 1 and including, a slip connection between one of said turntables and the reel carried thereby, whereby said last mentioned reel and said one turntable can rotate relative to each other, a capstan driven by said motor, lever means operable for moving said disc into direct driving engagement with said one turntable, a magnetic record element carried by said reels and disposed adjacent said capstan, and a pulley displaced by said lever means, as said lever means is operated to move said disc into direct driving engagement with said one turntable, to force said record element into driving engagement with said capstan.

12. A magnetic sound recorder as set forth in claim 4 and including, a slip connection provided on one of said turntables whereby the reel carried on said one turntable may rotate relative to said one turntable, a driven capstan, a magnetic record element carried by said reels and disposed adjacent said capstan, and a pulley displaced by said actuating means as said actuating means is operated to move said disc into driving engagement with said one turntable thereby to force said magnetic record element into driving engagement with said capstan.

13. A magnetic sound recorder as set forth in claim 1 and including, lever means operable for moving said disc into direct driving engagement with the turntables, a magnetic head, a magnetic record element carried by said reels and disposed adjacent said magnetic head, a pad disposed adjacent said magnetic head and record element, and means actuated by said lever means and engageable with said pad to move said pad and record element into contact with said magnetic head when said lever means is operated to engage the driving disc with one of said turntables.

14. A magnetic recorder as set forth in claim 4 and including, a magnetic head, a magnetic record element carried by said reels and disposed adjacent said magnetic head, a pad disposed adjacent said magnetic head and record element, and means operated by said actuating means and engageable with said pad to move said pad and record element into contact with said magnetic head when said actuating means is operated to engage said driving disc with one of said turntables.

15. A magnetic recorder as set forth in claim 1 and including, lever means operable for moving said disc into direct driving engagement with the turntables, a magnetic record element carried by said reels and extending therebetween, an erase head adjacent said record element and operative to remove recorded sound from the record element, and means actuated by said lever means to render said erase head inoperative when said lever means is operated to engage the driving disc with one of the turntables.

16. A magnetic recorder as set forth in claim 4 and including, a magnetic record element carried by said reels and extending therebetween, an erase head adjacent said record element and operative to remove recorded sound from the record element, and means operated by said actuating means to render said erase head inoperative when said actuating means is operated to engage the driving disc with one of the turntables.

References Cited in the file of this patent

UNITED STATES PATENTS

| | | |
|---|---|---|
| 647,472 | Brucksch | Apr. 17, 1900 |
| 820,936 | McAfee | May 15, 1906 |
| 1,023,593 | P'Pool | Apr. 16, 1912 |
| 1,123,147 | Sherman | Dec. 29, 1914 |
| 1,129,018 | Robertson | Feb. 16, 1915 |
| 1,315,970 | King | Sept. 16, 1919 |
| 1,351,671 | Mayhall | Aug. 13, 1920 |
| 1,571,610 | Tingley | Feb. 2, 1926 |
| 1,789,607 | Steurer | Jan. 20, 1931 |
| 1,994,005 | Plummer | Mar. 12, 1935 |
| 2,369,017 | Camras | Feb. 6, 1945 |
| 2,409,942 | Knapp | Oct. 22, 1946 |
| 2,413,108 | Latchford | Dec. 24, 1946 |
| 2,418,541 | Camras | Apr. 8, 1947 |
| 2,467,507 | Stone | Apr. 19, 1949 |
| 2,528,061 | Knapp | Oct. 31, 1950 |
| 2,535,486 | Dank | Dec. 26, 1950 |

FOREIGN PATENTS

| | | |
|---|---|---|
| 34,296 | Norway | Mar. 6, 1922 |